Sept. 18, 1928.  1,684,932
A. J. WEATHERHEAD, JR
METHOD OF UNITING METAL PARTS TOGETHER
Filed April 13, 1925      2 Sheets-Sheet 1
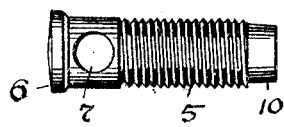
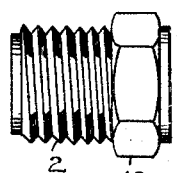
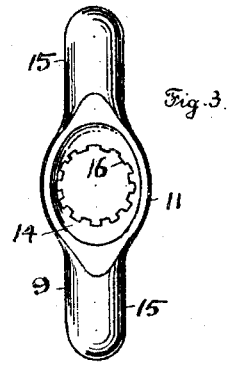
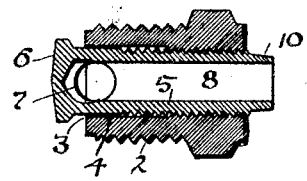
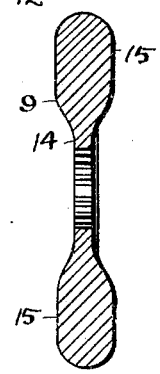
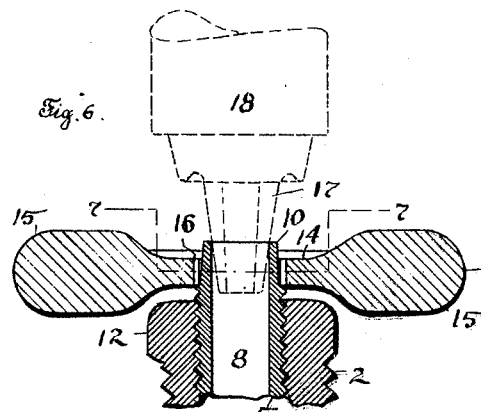
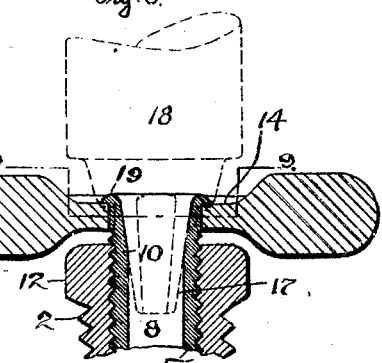
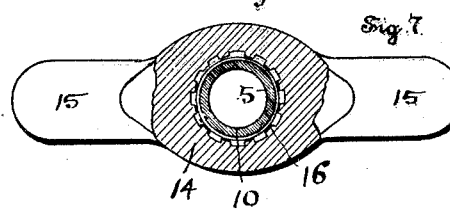
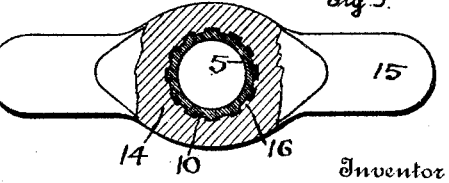
Inventor
A. J. Weatherhead Jr.
By Fisher, Moser & Moon
Attorney Sept. 18, 1928.  1,684,932
A. J. WEATHERHEAD, JR
METHOD OF UNITING METAL PARTS TOGETHER
Filed April 13, 1925   2 Sheets-Sheet 2
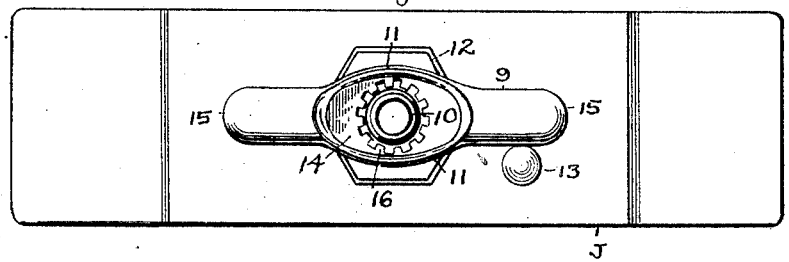
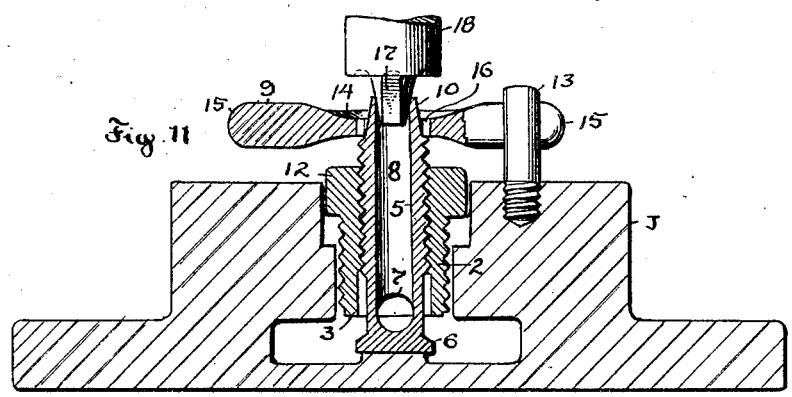
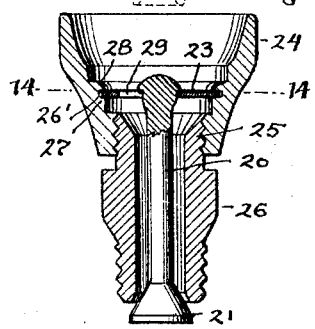
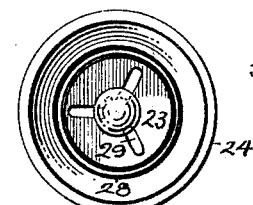
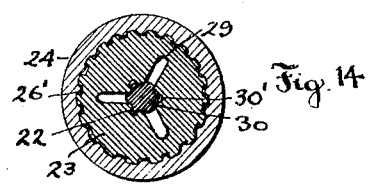
Inventor
A. J. Weatherhead Jr.
By Fisher Moser Tucook
Attorney Patented Sept. 18, 1928.

1,684,932

UNITED STATES PATENT OFFICE.

ALBERT J. WEATHERHEAD, JR., OF CLEVELAND, OHIO.

METHOD OF UNITING METAL PARTS TOGETHER.

Application filed April 13, 1925. Serial No. 22,732

My invention relates to a method of uniting metal parts together, particularly valve parts. Thus the present method is of especial utility in producing a cock or valve having an operating handle permanently affixed to the valve stem. The valve may comprise either a solid stem, a counterbored stem, or a hollow stem. The hollow stem is used in a valve wherein the discharge of the fluid is through the stem and handle. For example, in a known valve used in automobile radiators, engines, etc., the valve body is of relatively small dimensions and the valve stem is formed with a relatively large discharge passage axially thereof. This valve comprises three main parts,—a body having a valve seat, a valve having a stem, and a handle for the stem. These parts are inseparable after affixing the handle to the stem, and my general object is to unite the handle to the stem in a facile and inexpensive way after the stem and body have been assembled without injury to the valve seat and operating parts, and a further object is to secure the handle upon the stem so firmly that extreme torsional strains may be resisted at the union in operating the handle.

In the accompanying drawings, Fig. 1 is a side view of the hollow valve member; Fig. 2 is a similar view of the valve body; and Fig. 3 is an elevation of the handle, as such parts appear before being assembled and united together. Fig. 4 is a longitudinal section of the valve member inserted within the body and without the handle. Fig. 5 is a sectional view of the handle alone. Fig. 6 is an enlarged sectional view of the hollow valve stem protruding through the outer end of the valve body and showing the handle sleeved upon the stem preliminary to uniting the latter parts permanently together. Fig. 7 is a sectional view of the stem and handle on line 7—7 of Fig. 6; Fig. 8 is a sectional view corresponding to Fig. 6, but showing the union of parts completed, and Fig. 9 is a sectional view of the same parts on line 9—9 of Fig. 8. Fig. 10 is a top view of a jig and a valve seated therein as in handle affixing operations, and Fig. 11 is a sectional view of the same parts. Fig. 12 is a sectional view of a valved priming cup in which the valve stem is united to a perforated diaphragm within a cup-shaped handle. Fig. 13 is a top view of the priming cup, and Fig. 14 is a horizontal section on line 14—14 of Fig. 12.

In producing a valve such as delineated in the drawings, the body 2 is screw-threaded externally and internally and a valve seat 3 formed at one end of a counter bore 4. A hollow or tubular valve member 5 is also machined and screw-threaded to fit the internally screw-threaded bore of body 2, a closed valve head 6 being formed at one end and the opposite end being reduced and turned smooth, preferably on slight tapering lines. The enlarged valve head 6 is beveled to permit an effective closure to be obtained with the sharp edge of valve seat 3, and one or more openings 7 are drilled in the side wall of hollow member 5 closely adjacent the beveled portion of head 6. An axial opening 8 of substantial size extends from lateral openings 7 to the outer reduced end of valve member 5, and said member is also provided with screw-threads substantially its full length to permit said member to be rotatably connected to the body 2 and to move longitudinally therein to open and close the valve. Operating control of valve member 5 is effected by a handle 9 affixed permanently upon the reduced protruding portion or hollow stem 10 of said member. The handle is fastened to stem portion 10 after body 2 and valve member 5 have been assembled, and in producing the handle a widened flat area 14 is provided centrally between two round arms 15—15, and a reinforcing ridge or rib 11 is formed at the outer edge of this flat area to strengthen the handle where flattened. Area 14 is punched with a circular opening having serrations or teeth 16 extending inwardly at spaced intervals, and the diameter of the serrated opening is such that the handle may be readily sleeved upon the tapered hollow stem 10. The shape of the opening may vary but I have found it better to have the serrations closer together than the width or land of the serrations. When the distance between serrations is greater than the width of the serrations themselves I have found that this prevents the metal from flowing outwardly as it gives too much restricted surface and prevents the metal flowing easily into the serrations. After the valve body and stem have been assembled they are seated within a jig beneath a spinning or upsetting tool. Then the handle is sleeved over portion 10 on valve member 5, and the spinning tool or upsetting tool is forced into the tubular end of valve member 5, thereby forcing the metal out into the serrations and also downwardly into them. The tool is rotated in the same way as the hand of the thread, i. e., if the thread is right handed then the tool must rotate right handed and vice versa. This step of spinning locks the valve in a tightly closed position, but it can be easily opened by the fingers thereafter. Where it is desired to fasten the handle even more securely I insert a pin 13 in the jig J which the handle may engage if it turns with the tool, see Figs. 10 and 11. Then all further torsional strain is taken by this pin and there is no danger of turning the stem forcibly against corner part 3 of body member 2 which would spoil the valve seat. In Fig. 10 I show a hexagonal opening in the jig to receive the hexagonal enlargement 12 on valve body 2, thereby preventing this body from rotating in spinning operations. But it is not necessary to have a hexagonal hole to hold the hexagonal portion of body member 2 when a pin 13 is used to prevent rotation of the handle.

A rapidly revolving tool or a riveting machine may be used to expand the thin metal wall on outwardly flaring lines. In this operation the material in the outer circular surface of stem 10 is crowded into the interspaces between teeth 16, and the corners of the teeth are in effect embedded in the stem. The flat lands on the teeth offer the needed resistance to the expanding pressure, and the sharp squared corners are deeply embedded in the protruding wall of the hollow stem, thereby interlocking the parts very securely against torsional strain. A further union is effected by upsetting or flanging the outer end edge of the hollow stem over the serrated teeth, thereby causing the material in the peened portion of the stem to be crowded downwardly into the interspaces, thereby supplementing the lateral interlocking effect obtained in expanding the wall. This combined result is produced by the same instrument or tool used to expand the stem, for example an instrument such as delineated in dotted lines in Figs. 6 and 8, in which a grooved enlargement is provided at the base of the tapered extension 17 of the die or tool 18. The channeled or grooved portion is adapted to turn or swage the metal outwardly at the finish of the expanding and flaring operation on the hollow stem, thereby forming an annular bead 19 at the outer end of the stem adapted to lock the handle upon the stem. The additional interlocking effect is obtained by pressing the metal of said bead into the outer ends of the interspaces between the serrations or teeth. A tool having rollers may be used satisfactorily in spinning operations instead of a tapered tool as shown, and the same method may be practiced in fastening a handle on a solid stem by drilling a hole in the end of the stem so that the spinning tool may be inserted therein. In that case the stem is drilled sufficiently deep to allow the pilot of the spinning tool to enter far enough to spin the handle and stem securely together.

When the steps of uniting the handle to the stem are finished the valve member becomes an inseparable part of the valve body although movable longitudinally within limits therein as fixed by the valve head and the handle. Opening of the valve is effected by rotating the handle and when the valve head engages the seat at the inner end of the body the movement is checked. If rotative pressure is persistently applied to the handle under the mistaken impression that the movable valve member can be unscrewed and removed, a severe strain will be placed on the union between the handle and stem. The present method permits an exceptionally strong and durable interlocking connection to be made for the handle and stem whereby such strains are readily resisted and breakage prevented, and in the case of a hollow stem a large valve passage may be provided in a comparatively small valve body. Furthermore, the passage for the flow of fluid is not contracted and reduced in size but is enlarged or flared to larger dimensions at the outer end by the steps herein described.

In Figs. 12 to 14, inclusive, I show a priming cup and valve which consists of four parts adapted to be assembled and united together by expanding the round stem 20 of a valve 21 within an opening 22 of irregular shape at the center of a diaphragm or wall 23 of a handle member 24 of cup shape. Member 24 is screw-engaged with the reduced end 25 of valve body 26, and diaphragm 23 is a flat metal disk having a serrated periphery 26 which is seated upon an annular shoulder 27 and locked in fixed position by spinning an annular flange 28 down upon the serrated part of the diaphragm and crowding the metal into the serrated spaces. A series of radial slots 29 extend outwardly from a central opening in diaphragm 23, and these slots permit the fluid to discharge from the tubular valve body when valve 21 is unseated. The solid round stem 20 of the valve extends upwardly through the central opening of the diaphragm and is rigidly fastened thereto after the cup-shaped handle member 24 is screw-engaged with body 26. This is accomplished by seating body 26 within a jig of the kind shown in Fig. 11, or any other suitable jig, and projecting stem 20 through the irregular shaped opening at the center of diaphragm 23. The stem is smooth and round and may be straight or tapered at the beginning of operations, but is expanded by an upsetting pressure applied to the exposed end of the stem. In so doing the stock flows into the radial slots 29 and into contact with the corners 30 formed by such slots and the interspaces 30 which subdivide the edge of the opening and form a notched or serrated edge adapted to effect an interlocking union between the stem and diaphragm when the exposed end of the stem is upset and peened over. Either a spinning tool, or a riveting tool which is adapted to rotate as well as reciprocate, may be used to upset and expand the solid stem.

It may be deduced from the foregoing that a solid stem may be upset and expanded by a riveting device, or a hollow stem may be upset and expanded by a rotatable device; that in either case I form an opening in the handle which does not conform exactly to the shape of the stem, and that I preferably use an irregular or serrated opening as described and employ either a straight or tapered stem with a round smooth wall which may be readily expanded and crowded into the irregular border edge of said opening.

What I claim, is:

1. A method of uniting metal parts together, consisting in producing in one part an opening bordered with axially-extending angular teeth and interspaces, and in inserting a second part into said toothed opening and expanding the wall thereof on flaring lines opposite said axially extending teeth and interspaces until said parts are interlocked together.

2. A method of uniting metal parts together, consisting in forming a longitudinally serrated opening in the face of one part; inserting a hollow member into said opening; and in crowding the wall of said member laterally into the serrated interspaces and also the outer end thereof at right angles into and upon the top of the serrated face of said first part.

3. A method of uniting metal parts together, consisting in sleeving a serrated portion of one part over a tubular part while permitting a portion of the tube to protrude through said opening, and then expanding the wall of said tube into inter-locking engagement with the serrated part and flanging said protruding end outwardly beyond the serrations while pressing the material into the ends of the serrations.

4. A method of uniting a handle and stem together, consisting in forming a re-enforced flat area in a handle member; in making an irregular shaped opening within said re-enforced area; and in inserting a stem through said opening and expanding the same into locking engagement with the edge of said opening.

5. A method of uniting a valve body and a tubular valve member and a handle inseparably together, consisting in projecting the valve member through the body; in sleeving the handle over the tubular end of the valve member, and in expanding the outer end of the tubular member into locking union with said handle, thereby securing the three valve parts inseparably together.

6. A method of making a valve, consisting in seating a valve body and a valve stem together within a jig; in sleeving a handle member upon said stem; and in expanding said stem within said handle and securing the three valve parts inseparably together while the parts are thus seated.

7. A method of making a valve, consisting in inserting a valve stem within a valve body; in seating said body and stem jointly within a jig; in sleeving a serrated handle over said stem; and in expanding said stem into locking union with the serrations in said handle while holding one of said parts from rotation.

8. A method of making a valve, consisting in assembling a valve body, a tubular valve stem and a handle member together; and in applying pressure rotatively internally of one end of the stem to unite the handle rigidly thereto while holding said handle against rotatable movement.

9. A method of making a valve, consisting in sleeving a handle upon the stem of a valve member screw connected with a valve body, and in expanding said stem into locking union with said handle by a spinning and pressing tool while holding the valve body from turning and limiting axial movement of said valve member.

In testimony whereof I hereby affix my signature.

ALBERT J. WEATHERHEAD, Jr.